United States Patent
Stocker et al.

(10) Patent No.: US 6,510,323 B1
(45) Date of Patent: Jan. 21, 2003

(54) METHOD AND SYSTEM FOR PROVIDING GENERAL INFORMATION TO USERS IN A MOBILE RADIO NETWORK

(75) Inventors: Markus Stocker, Nottwil (CH); Carmine Russo, Fribourg (CH); Martin Dätwyler, Bremgarten (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/263,100

(22) Filed: Mar. 5, 1999

(51) Int. Cl.[7] .................................................. H04Q 7/20
(52) U.S. Cl. ........................ 455/466; 455/435; 455/456; 455/433
(58) Field of Search .................................. 455/466, 456, 455/457, 458, 433, 435

(56) References Cited

U.S. PATENT DOCUMENTS

| | | | | |
|---|---|---|---|---|
| 5,214,789 A | * | 5/1993 | George | 455/33.2 |
| 5,778,304 A | * | 7/1998 | Grube et al. | 455/33.1 |
| 5,915,238 A | * | 6/1999 | Tjaden | 704/260 |
| 5,930,699 A | * | 7/1999 | Bhatia | 455/414 |
| 5,940,756 A | * | 8/1999 | Sibecas et al. | 455/426 |
| 5,960,356 A | * | 9/1999 | Alperovich et al. | 455/458 |
| 6,044,263 A | * | 3/2000 | Valentine et al. | 455/414 |
| 6,055,434 A | * | 4/2000 | Seraj | 455/456 |
| 6,094,575 A | * | 7/2000 | Anderson et al. | 455/422 |
| 6,104,929 A | * | 8/2000 | Josse et al. | 455/445 |
| 6,167,266 A | * | 12/2000 | Havinis et al. | 455/433 |
| 6,185,421 B1 | * | 2/2001 | Alperovich et al. | 455/433 |
| 6,216,004 B1 | * | 4/2001 | Tiedemann, Jr. et al. | 455/458 |

FOREIGN PATENT DOCUMENTS

| | | |
|---|---|---|
| DE | 19614168 A1 | 10/1997 |
| WO | WO 98/08350 | 2/1998 |
| WO | WO 99/26431 | 5/1999 |

OTHER PUBLICATIONS

"Optional New and Enhanced Features in MSC/VLR R7.0"; REv. G; Nov. 2, 1998; see sector NF 469.1.
"Optional new and enhanced features in MSC/VLR R7.0", Nov. 2, 1998, Ericsson.

* cited by examiner

*Primary Examiner*—Thanh Cong Le
*Assistant Examiner*—Thuan T. Nguyen

(57) ABSTRACT

In the field of mobile radio telephony, a method and system are provided for sending general information messages to users in a mobile radio network on a geographical selective basis. A mobile station is the mobile radio network is capable of sending location update messages to the mobile radio network. These location update messages include information of the location of the mobile station. The general information message to be sent is registered in the network, together with an identification of a served geographical area to which the general information message is relevant. When a location update message is received from a mobile station located within this served geographical area, the general information message is sent to this mobile station.

14 Claims, 4 Drawing Sheets

Fig. 3

General Information Message Register (GIMR) 300

| 310 | 320 | 330 | 340 |
|---|---|---|---|
| Message text string | Type of LU to be used for triggering | Identification of served area 195 | Send to all subscribers indication |
| Snow storm in Bern area – be careful on the roads | IA, NLU, PLU | MSC area 1 | Yes |
| Welcome to Swissair Zurich | IA, NLU | LA 77 | No |

METHOD AND SYSTEM FOR PROVIDING GENERAL INFORMATION TO USERS IN A MOBILE RADIO NETWORK

FIELD OF THE INVENTION

The present invention relates generally to the field of mobile radio telephony, and more particularly to a method and system for sending general information messages to users in a mobile radio network.

BACKGROUND

The usage of mobile radio telephony has increased enormously in many parts of the world during the past decade, and mobile telephones have become commonplace possessions. As a consequence of this, the coverage areas of the mobile radio networks have increased, and in many countries, most of the inhabited areas experience mobile radio coverage. This provides an excellent opportunity for the supply of general information to many people at a time, on a geographical selected basis, i.e. to people who are located within a certain geographical region. Since many of the mobile radio telephony standards used around the world provide data services as well as speech services, information can be supplied to the mobile radio subscribers in writing.

Such possibilities of information supply can be very useful for a number of different information suppliers, such as road keepers informing about the local state of the road, the police informing about an incident, operators of mobile telephone networks informing about temporary discounts on calls, store keepers informing about sales, etc. The number of situations where this type of information supply service could be of use is about endless.

In the Global Systems for Mobile communication (GSM) standard, there is a service defined called Short Message Service (SMS) Cell Broadcast, which provides an information supplier with the possibility of broadcasting a message to the GSM users within a certain geographical region, see GSM Technical Specification (TS) 03.02. The geographical region in which a SMS Cell Broadcast message is broadcast is defined on a per message basis and can include one or more cells, or even an entire Public Land Mobile Network (PLMN). An SMS Cell Broadcast message is broadcast cyclically by the Base Transceiver Stations (BTSs) in the defined geographical region at a frequency and duration specified by the information supplier.

However, in order to receive a SMS Cell Broadcast message, a mobile subscriber must at an initial stage have set his mobile station in the mode for receiving SMS Cell Broadcast. In some GSM networks, the subscriber also has to choose, in the mobile station, which information categories he is interested in receiving, since the messages broadcast are divided into different categories. This is a rather awkward operation, and few subscribers to GSM services know about the SMS Cell Broadcast service. Thus, the information supplier only reaches the mobile subscribers who have actively chosen to receive SMS Cell Broadcast messages, and the subscribers who have not set their mobile stations in the mode for receiving such messages will miss the information broadcast.

SUMMARY

An object of the present invention is to provide, in a mobile radio network, a service by which suppliers of general information can supply general information to the mobile radio network users in a certain geographical area, without the users having to set their mobile stations in the mode for receiving such information.

According to the invention, this has been solved by a method and system for sending a general information message to a mobile station in a mobile radio network. A mobile station in the network is capable of sending location update messages to the mobile radio network, where these location update messages include information of the location of the mobile station and an identity of the subscriber using the mobile station.

The invention method comprises the steps of registering the general information message in a general information message register in the mobile radio network, including registering an identification of served area; receiving a location update message from the mobile station; comparing the identification of served area with the information of the location of said mobile station included in the location update message; determining whether said general information message should be sent to said mobile station based on the result of the step of comparing; and said sending said general information message to said mobile station if, in the step of determining, it is determined that said general information message should be sent.

The inventive system comprises general information message registering means for registering the general information message, in which at least an identification of served area can be registered; receiving means for receiving a location update message from the mobile station; comparing means for comparing the identification of served area with the information of the location of said mobile station included in the location update message; determining means for determining whether said general information message should be sent in the mobile station; and sending means for sending a general information message to the mobile station.

By the system and method of the present invention is achieved that a supplier of general information can reach users of mobile telephony in a certain geographical region without having to rely on the users having set their mobile stations in the mode for receiving such information. It is further achieved that a user of mobile telephony will not miss any general information relevant to the geographical area in which he is presently located due to the fact that he has not set his mobile station in the mode for receiving such information.

In one aspect of the invention, wherein the mobile radio network comprises at least one Mobile Services switching Center (MSC), the location of the general information message registering means is in an MSC. Hereby is achieved that the signaling in the system is minimized when the location updating message is sent to the MSC.

In another aspect of the invention, wherein the mobile radio network comprises at least one Serving GPRS Support Node (SGSN), the location of the general information message registering means is in an SGSN. Hereby is achieved that the signaling in the system is minimized when the location updating message is sent to the SGSN.

In one aspect of the inventive method, the step of registering general information messages further includes the step of registering at least one type of location update to be used for triggering sending of the general information message; and the step of comparing further comprises the step of comparing the at least one type of location update registered in said step of registering with the type of the location update message received in the step of receiving. In one aspect of the inventive system, the general information message registering means further comprises registering means for registering at least one type of location update to be used for triggering sending of the general information message; and the comparing means further comprises means for comparing the at least one type of location with the type of a location update message received by the receiving means.

Hereby is achieved that the operator of the mobile network, or the supplier of general information, can determine which type(s) of location updating should trigger sending of the general information message.

In another aspect of the present invention, the general information message is an Unstructured Supplementary Services Data (USSD) message and correspondingly, in one aspect of the inventive system, the location of the sending means is in an MSC/VLR. Hereby is achieved that a mobile station capable of receiving network initiated USSD messages is capable of receiving the general information message.

In a further aspect of the present invention, the general information message is a Short Message Services (SMS) message, and correspondingly, in one aspect of the inventive system, the location of the sending means is in an SMS Service Centre. Hereby is achieved that a mobile station capable of receiving SMS messages is capable of receiving the general information message.

In yet another aspect of the invention, wherein the mobile radio network comprises at least one location register, the inventive method further comprises the steps of indicating, in a location register, whether the subscriber of the mobile station is a subscriber to general information messages and checking in the location register whether the subscriber is a subscriber to such messages. Furthermore, the step of determining is further based on the result of the step of checking. One aspect of the inventive system further comprises indicating means for indicating in a location register whether the subscriber using the mobile station is a subscriber to general information messages and checking means for checking in the location register whether the subscriber is a subscriber to such messages. Hereby is achieved that a subscriber in a mobile radio network may choose whether or not to receive general information messages. It is further achieved that the operator of the mobile radio network may provide different subscriptions to subscribers who would like to receive general information messages and subscribers who would not like to receive such messages.

BRIEF DESCRIPTION OF THE DRAWINGS

The present invention will now be discussed in more detail with reference to preferred embodiments of the present invention, given only by way of example, and illustrated in the accompanying drawings, in which:

FIG. 3 illustrates an exemplary general information messages register used in one embodiment of the present invention.

DETAILED DESCRIPTION

Figure 1:
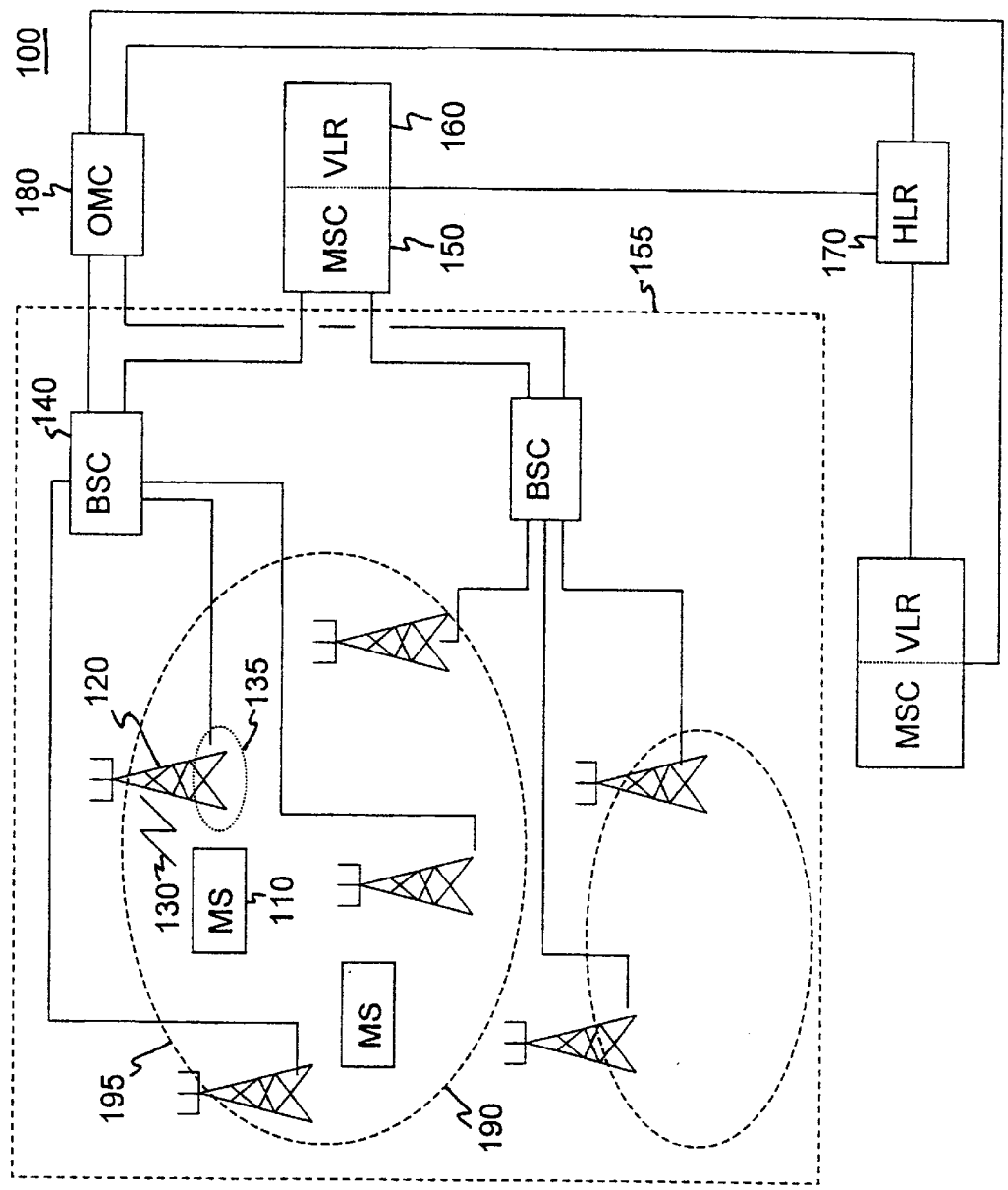
FIG. 1 schematically illustrates an exemplary mobile radio network comprising mobile stations, base transceiver stations, base station controllers, mobile services switching centres, visitors location registers, a home location register and an operation and maintenance centre.

The general architecture of a mobile radio network 100 is schematically illustrated in FIG. 1. Mobile radio network 100 provides radio communication to users of Mobile Stations (MS) of which an exemplary MS 110 is shown in the figure. In FIG. 1, the MS 110 is shown to communicate within the mobile radio network 100 via a Base Transceiver Station (BTS) 120 using a radio link 130. The geographical area within which a BTS 120 takes traffic is referred to as a cell 135, and each cell 135 is assigned a unique identity known as the Cell Global Identity (CGI). Several BTSs belonging to the mobile radio network 100 may be connected together via Base Station Controller (BSC) 140. Several BSCs 140 may in turn be connected to a Mobile Services switching Centre (MSC) 150, which is responsible for management of the calls to and from the MSs 110. A MSC 150 further constitutes the interface between mobile radio network 100 and other networks such as Public Switched Telephony Networks (PSTN), Integrated Services Digital Network (ISDN), other Public Land Mobile Networks (PLMN), the Internet etc. The geographical area served by one single MSC is referred to as an MSC area 155.

Within a limited geographical area known as the coverage area of mobile radio network 100, a MS 110 can roam freely and still experience radio communication services provided by the mobile radio network 100. Since the MS 110 is not stationary, in order to establish a connection to an MS 110, the mobile radio network 100 needs to know where the MS 110 is located. Two different types of location registers are used for this purpose: the Visitor Location Register (VLR) 160 and the Home Location Register (HLR) 170. The HLR 170 is the location register to which a mobile subscriber is permanently assigned for purposes of storing information such as subscriber information. Some location information may also be stored in the HLK 170, enabling the charging and routing of calls towards the MSC 150 where the MS 110 is presently located. More detailed information about the location of a MS 110 is however stored in the VLR 160 in charge of the geographical area in which the MS 110 is presently located. In the exemplary mobile radio network 100, the MSC 150 and the VLR 160 are located in the same physical node, hereinafter referred to as MSC/VLR 150/160.

In order to be able to operate and maintain the mobile radio network 100 in a convenient way, the nodes of the mobile radio network 100 are connected to an Operation and Maintenance Centre (OMC) 180.

The mobile radio network 100 is divided into several Location Areas (LA) 190. A LA 190 constitutes the area in which a MS 110 can move freely without updating the VLR 160 of the location of the MS 110. Each LA 190 is assigned a unique Location Area Identity (LAI), and every BTS 120 of the network is assigned one LA to which it belongs. One or several BTSs 120 may belong to the same LA 190.

In a Global System for Mobile communications (GSM) network, there are several procedures related to the registration of the location of a MS 110 which are used in order to keep the location registers updated, see GSM Technical Specification (TS) 03.12. These are e.g. normal location updating, periodic location updating, International Mobile Subscriber Identity (IMSI) attach, IMSI detach and location cancellation. The normal location updating (NLU), periodic location updating (PLU) and IMSI attach (IA) are procedures for informing the network of the present whereabouts of a MS 110 and in the following, the common term Location Updating (LU) will be used to refer to such procedures. Other types of LU may also be used. For example, in a GSM network which provides General Radio Packet Service (GPRS) to its subscribers, the routing area update or the cell update could also be used. A LU message is a message sent from a MS 110 to the MSC 150 which is serving the area in which the MS 110 is presently located, or to another node with corresponding functionality, e.g. to the Serving GRPS Support Node (SGSN) in a GSM network which provides GPRS services. Among other things, the LU message contains information about the CGI of the cell 135 in which the MS 110 is presently located as well as an identity of the subscriber presently using MS 110. An MSC 150 which has received a LU message from an MS 110 conveys the LU message to the VLR 160 associated with the MSC 150. The VLR 160 may in turn send some of the information in the LU message to the HLR 170.

The different types of LU can be used at different occasions. The IMSI attach procedure is the action taken by a MS 110 when powered up, in order to indicate to the mobile radio network 100 that the MS 110 has reentered an active state. The normal location updating procedure is used by a MS 110 when a new LA 190 is entered. A BTS 120 is constantly transmitting on its Broadcast Control CHannel (BCCH) to which an idle MS 110 in the corresponding cell 135 listens, among other things transmitting the LAI of the LA 190 to which the BTS 120 belongs. When a MS 110 detects that it is listening to a BTS 120 which transmits a different LAI than the LAI of the BTS to which it was previously listening, the MS 110 performs a normal location updating procedure in order to inform the mobile radio network 100 of that the MS 110 has entered a new LA 190. The periodic location updating procedure can be used by the mobile radio network 100 to force the MSs 110 to perform Lu regularly. A MS 110 which has moved out of the coverage area of the mobile radio network 100, or has been powered off without the IMSI detach message being perceived by the mobile radio network 100, will be marked as detached in the VLR 160 when an expected periodic location updating message has not been received from the MS 110 by the mobile radio network 100.

As can be seen from the above, the location of an MS 110 is known by the MSC/VLR 150/160 which has just now received a LU message. This fact can be utilized in the mobile radio network 100 for a general information supply service according to the present invention. The reception of a LU message by the mobile radio network 100 can be used as a trigger for sending a general information message to a subscriber who has performed a LU in a geographical region which has been selected as the geographical region in which the particular general information message will be sent. Thus, a general information supply service which sends general information messages on a subscriber basis can be implemented in the mobile radio network 100.

A geographical region, which has been selected as the geographical region in which a particular general information message will be sent, will in the following be referred to as the severed area 195 of the general information message. In FIG. 1, a served area 195 of a particular message, corresponding to the LA 190, is shown. The served area 195 is preferably expressed in terms of already defined areas in the mobile radio network 100. In a GSM network, these areas could be, e.g., a cell 135 (identified by the Cell Global Identity (CGI)), a location area 190 (identified by the Location Area Identity (LAI)) or an MSC area 155. In a LU message, information about to which cell 135 the MS 110 listens as well as in which LA 190 this cell 135 is located is included.

Figure 2:
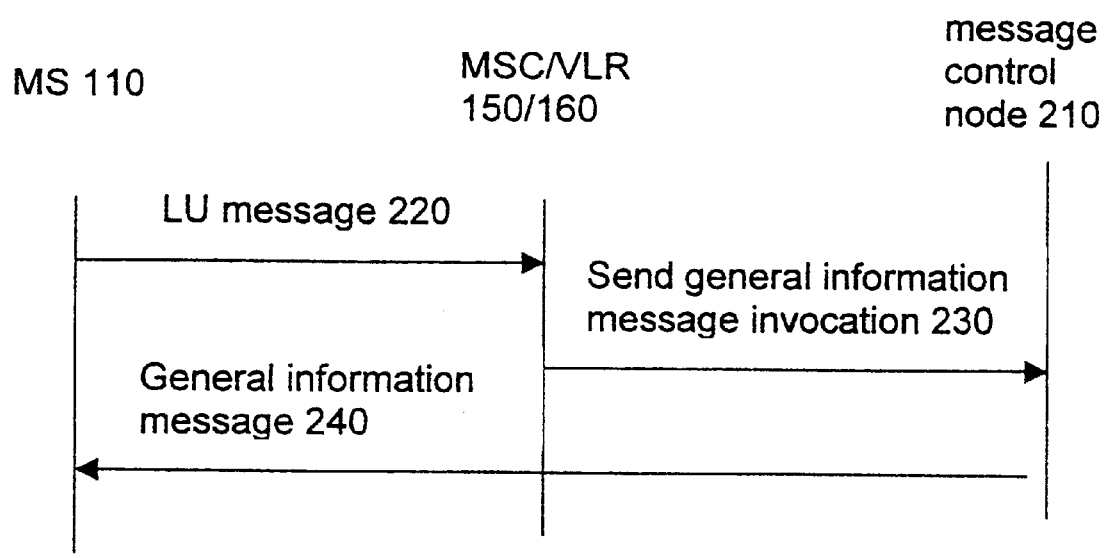
FIG. 2 is an overview sequence diagram illustrating the flow of messages between various devices of the system during the operation of the method in one embodiment of the present invention.

In FIG. 2, an exemplary flow of messages within the mobile radio network 100 is schematically shown. An MS 110 sends a LU message 220 to an MSC/VLR 150/160. The MSC/VLR 150/160 then analyzes the LU message 220, and determines whether there is a general information message 240 which should be sent to the MS 110. If so, a send general information message invocation 230 is sent to a message control node 210. Included in the send general information message invocation 230 is the message text string, which is to be sent the MS 110, as well as an identification of the MS 110. Upon reception of the send message invocation 230, the message control node 210 sends a general information message 240 to the MS 110.

The general information message 240 sent to the MS 110 in FIG. 2 could be of any message type available in the mobile radio network 100. In a GSM network, the message could be e.g. an Unstructured Supplementary Services Data message or a Short Message Service (SMS) message. The message control node 210 would then be a node which can send a network initiated USSD message (e.g. an MSC 150, a VLR 160 or an HLR 170) or an SMS Service Center, respectively. In a GSM network which supports GPRS, the message control node could e.g. be a server in the network, or the SGSN. In such a network, the node which receives the LU message in FIG. 2 could be either the MSC/VLR or the SGSN.

In FIG. 3, an example of a General Information Message Register (GIMR) 300 used for registering different general information messages 240 to be sent to subscribers who have performed a LU is shown. Such a GIMR 300 could preferably be implemented in the node which receives the LU message from the MS 110, e.g. the MSC/VLR 150/160 in a GSM network, but could also be implemented elsewhere.

In the exemplary GIMR 300 schematically illustrated in FIG. 3, the entry 310 is used to store the general information message test string. Two exemplary text strings are shown in the figure, and the corresponding entries 320, 330 and 340 have been filled in accordingly. Entry 320 is used to indicate for which type of LU received the message stored in 310 will be sent: on reception of a normal location update, and IMSI attach or a periodic location update, or on any other location updating procedure used by the network. Of course, the entry 320 could be set to sending the message stored in entry 310 on reception of any type of LU, or of some types but not all. If an operator of a mobile network 100 does not wish to have the possibility of choosing which type of LU to trigger the sending for each general information message stored in 310, then this information does not have to be included in the GIMR 300 but the choice made by the operator can instead be hard coded.

In entry 330 of the exemplary GIMR 300, the served area 195 of a general information text string is entered.

Since some subscribers to mobile telephony services might not appreciate receiving general information messages 240, a possibility of not accepting the reception of such messages could be implemented. An operator could e.g. have different types of subscriptions: one subscription where the subscriber accepts to receive general information messages 240, and one subscription where the subscriber does not accept to receive general information messages 240. This could be implemented by assigning a subscriber category to a subscriber in the HLR 170. This subscriber category would then be sent to a VLR 150, together with other subscription information, when a MS 110 registers with the VLR 150.

Entry 340 of GIMR 300 in FIG. 3 can be used when the operator of a mobile network 100 chooses to give the subscribers in the mobile radio network 100 the option of whether or not to accept the reaction of general information messages 240. In the entry 340 it is marked whether or not a general information message 240 should be sent to all subscribers, regardless of acceptance. This could e.g. be useful if the police or a road keeper would like to reach as many people as possible with an important message. However, if the operator does not let the subscribers choose whether or not to accept the reception of general information messages 240, or if he does not want to have to option to send general information messages 240 also to subscribers who have not accepted the reception of such messages, then the entry 340 can be removed from GIMR 300.

Figure 4:
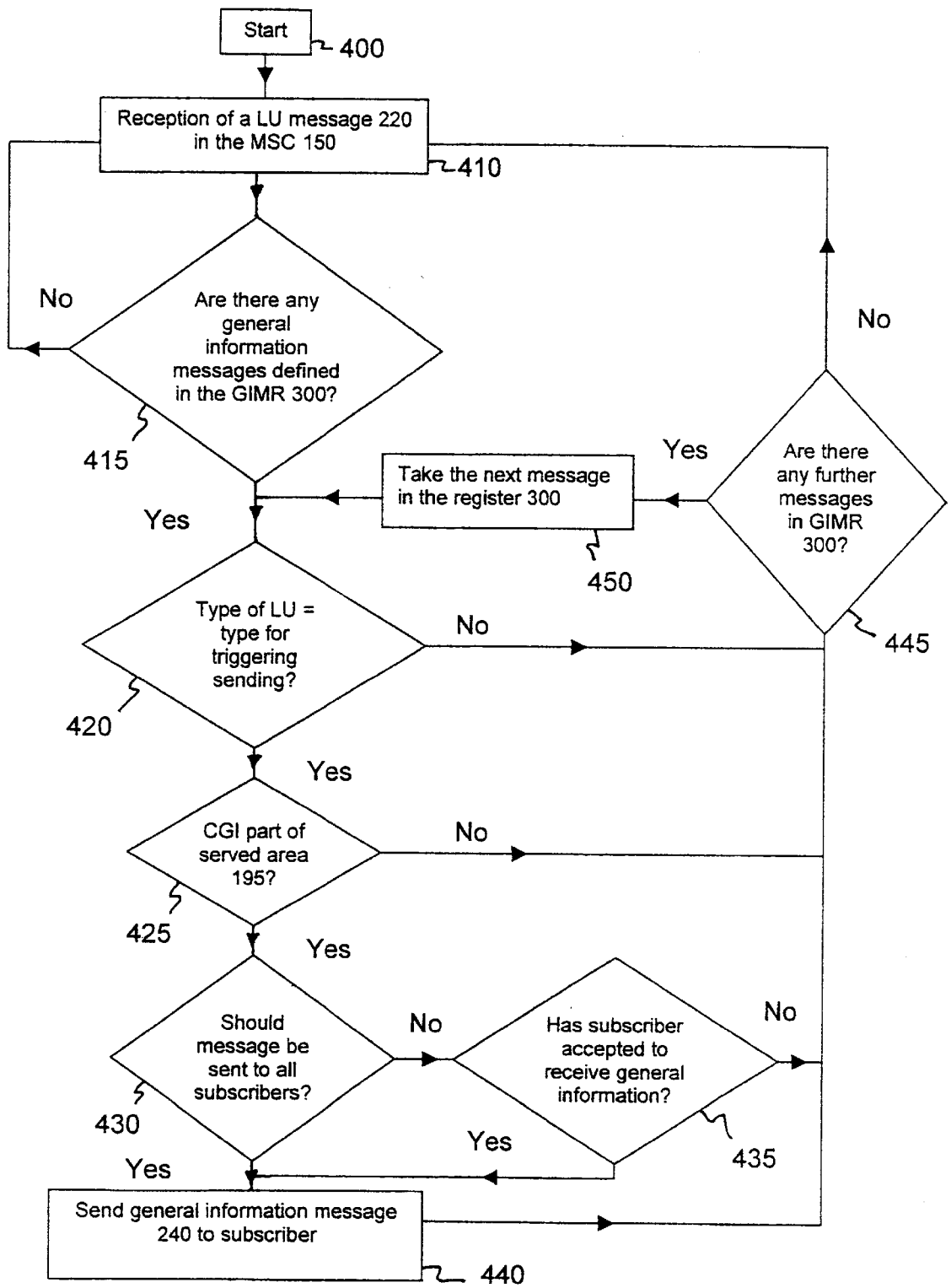
FIG. 4 schematically illustrates a flow diagram of an exemplary method used for sending general information messages to users in the mobile radio network in FIG. 1.

In FIG. 4, an exemplary embodiment of the method of the present invention is shown in flow chart form. In step 410, a LU message 220 is received in an MSC 150 from an MS 110. This triggers a number of actions in the MSC 150 and VLR 160, which are not shown in the flow chart since they are part of prior art. One of the these actions is that it is checked whether the MS 110 is already registered in VLR 160. If not, relevant information will be sent to HLR 170. HLR 170 will in return send relevant subscriber data to VLR 160. Part of this subscriber data could be information about whether the subscriber of MS 110 has accepted to receive general information messages 240.

In step 415, it is checked whether any general information message 240 has been registered in the GIMR 300. If one or several general information messages 240 have been defined in the GIMR 300, then step 420 is entered. If no general information message 240 has been defined, then no further action is taken until another LU message 220 has been received. In step 420, it is checked whether the type of LU corresponds to the type of LU which the sender would like to use as trigger for sending the general information message 240 (entry 320 in GIMR 300). If there is no correspondence, the step 445 is entered, where it is checked whether there are any further general information messages 240 registered in the GIMR 300. If so, then step 450 will be entered, where the next message in the GIMR 300 is taken for consideration. If there are no more general information messages 240 registered in the GIMR 300, no further action is taken until another LU message 220 has been received.

However, if there is correspondence between the type of the LU received and the type specified for triggering, then step 425 is entered. In step 425, it is checked whether the cell 135 serving mobile station 110 is part of the served area 195 defined for the particular general information message 240 (entry 330 in GIMR 300). If not, step 445 is entered. However, if the cell serving mobile station 110 is part of the served area 195, then step 430 is entered. In step 430, it is checked whether the particular general information message 240 should be sent to all subscribers, regardless of acceptance of reception (entry 340 in GIMR). If the answer is yes, then step 440 is entered, and the general information message 240 (entry 310 in GIMR 300) is sent to the MS 110. If the answer is no, then step 435 is entered, where is checked whether the subscription of MS 110 includes the reception of general information messages 240. If not, then step 445 is entered. However, if the subscription message 240 (entry 310 in GIMR 300) is sent to the MS 110. When the particular general information message 240 has been sent to the MS 110, then step 445 is entered.

There are many alternative embodiments of the inventive method, of which one embodiment is shown in the flow chart of FIG. 4. The steps of FIG. 4 do not have to be performed in the exact order presented in the figure, and some of the steps presented can be omitted. E.g., step 420 will not have to be performed if the type of LU which triggers the sending has been hard coded, or if all types of LU should always be used as triggers for sending. Another example is that step 430 is an optional step, and the operator of a mobile radio network 100 could chose not to provide the option of sending general information messages 240 to a subscriber even if the subscriber has not accepted to receive such messages. If the operator of mobile radio network 100 does not let the subscribers choose whether or not to receive general information messages 240, then the steps 430 and 435 become superfluous. Further steps could also be included. For example, a step of checking whether the MS 110 is capable of receiving the message type to be sent could be included, such as checking whether the MS is capable of receiving network initiated USSD messages when the message to be sent is a USSD messaged. In another embodiment, the type of message to be sent could be chosen on a per message basis and a corresponding entry would then be included in GIMR 300. Before a particular message is sent, the step of checking which message type should be used would then be performed.

If the normal location updating procedure is used as a trigger for sending of a message, it should be checked that the reserved area 195 selected for the message is not smaller than the LA 190 (or the LAs 190) in which the served area 195 is located. If the served area 195 would be smaller than the LA 190, then it is possible that the MS 110 enters the LA 190 via a cell that is not part of the served area 195. Since the normal location update message is sent by the MS 110 only upon entering a new LA 190, then the MS 110 would not receive the particular general information message 240 even if the MS 110 eventually did enter the served area 195. However, the LA 190 can be defined to correspond to any selected served area 195, since a LA 190 can consist of any number of cells 135 within an MSC area 155.

In order to enter information in the GIMR 300, Man Machine Language (MML) commands or parameter settings could be specified for this purpose. Since the OMC 180 is connected to most nodes a mobile radio network 100, and in particular to all MSCs 150, the OMC 180 can be used as a centralized node for entering information in the GIMRs 300 of a mobile radio network 100.

Although the description above has mainly been expressed in terms of a GSM network, the invention may be used in any other standard of mobile radio telephony which permits the sending of data messages and where a MS 110 is capable of sending a LU message 240, such a the Wide-band Code Division Multiple Access (w-CDMA) standard Universal Mobile Telephony System or D-AMPS (also referred to as Time Division Multiple Access (TDMA)). One could also think of a general in formation service where the type of message sent is an ordinary phone cell made by a recorded voice. Such a service could be implemented also in mobile radio networks 100 using a standard which does not provide for any data service.

What is claimed is:

1. A method of sending a general information message to a mobile station in a mobile radio network, the mobile station being capable of sending location update messages to the mobile radio network, the location update messages including location information associated with the mobile station and an identity associated with a subscriber using the mobile station, the method comprising the steps of:

registering the general information message and an identification of a served area associated with the general information message, in a general information message register in the mobile radio network;

receiving a location message from the mobile station;

comparing the identification of the served area with the location information included in the location update message; and triggering the sending of the general information message to the mobile station in response to a favorable comparison between the identification of the served area and the location information.

2. The method according to claim 1, wherein the mobile radio network comprises at least one Mobile Services Switching Center wherein the general information message register is located in the at least one Mobile Services Switching Center.

3. The method according to claim 1, wherein the mobile radio network comprises at least one Service GPRS Support Node, wherein said general information message register is located in the at least one Servicing GPRS Support Node.

4. The method according to claim 1, wherein the location update message includes one or more types of location update messages and wherein the step of registering the general information message further includes the step of registering at least one of the one or more types of location update messages to be used for triggering the step of sending of the general information message; and wherein the step of comparing further comprises the step of comparing the at least one of the one or more types of location update messages registered in said step of registering with a type of the received location update message.

5. The method according to claim 1, wherein said general information message includes an Unstructured Supplementary Services Data (USSD) message.

6. The method according to claim 1, wherein said general information message includes a Short Message Service (SMS) message.

7. The method according to claim 1, wherein the mobile radio network comprises at least one location register, the method further comprising the steps of:

indicating in a location register whether the subscriber using the mobile station is a subscriber to general information messages; and checking the location register, using the identify associated with the subscriber using the mobile station to identify the subscriber in the location register, whether the subscriber is a subscriber to general information messages; and wherein the step of sending is further based on the result of the step of checking.

8. A system for sending a general information message in a mobile radio network to a mobile station, the mobile station being capable of sending location update messages to the mobile radio network, the location update messages including location information associated with the mobile station and an identity associated with the subscriber using the mobile station, the system comprising:

general information message registering means for registering the general information message and an identification of a served area associated with the general information message;

receiving means for receiving a location update message from the mobile station;

comparing means for comparing the identification of the served area with the location information included in the location update message; and triggering means for sending the general information message to the mobile station in response to a favorable comparison between the identification of the served area and the location information.

9. The system according to claim 8, wherein the mobile radio network comprises at least one Mobile Services Switching Center, wherein the general information message registering means is located in the at least one Mobile Services Switching Center.

10. The system according to claim 8, wherein the mobile radio network comprises at least one Serving GPRS Support Node (SGSN), wherein the general information message registering means is located in the at least one Serving GPRS Support Node.

11. A system according to claim 8, wherein the location update message includes one or more types of location update messages and wherein the general information message registering means further comprises registering means for registering at least one of the one or more types of location update messages to be used for triggering the sending means to send the general information messages; and wherein the comparing means further comprises means for comparing the registering at least one of the one or more types of location update messages with a type of location update message received by the receiving means.

12. The system according to claim 8, wherein the sending means is located in an MSC/VLR and the general information message includes a Unstructured Supplementary Services Data (USSD) message.

13. The system according to claim 8, wherein the sending means is located in a Short Message Services (SMS) Service Center and the general information message includes a Short Message Services (SMS) message.

14. The system according to claim 8, wherein the mobile radio network comprises at least one location register, the system further comprising:

indicating means for indicating in a location register whether the subscriber using the mobile station is a subscriber to general information messages; and checking means for checking in the location register, using the identity of the subscriber using the mobile station to identify the subscriber in the location register, whether the subscriber is a subscriber to general information messages.

* * * * *